(12) United States Patent
Goudeau et al.

(10) Patent No.: US 12,007,511 B2
(45) Date of Patent: Jun. 11, 2024

(54) METHOD FOR USING AN ACTIVE SONAR WITH A WIDE SPECTRAL EMISSION BAND AND SONAR SYSTEM

(71) Applicant: THALES, Courbevoie (FR)

(72) Inventors: Jean-Philippe Goudeau, Valbonne (FR); Philippe Mellano, Valbonne (FR)

(73) Assignee: THALES, Courbevoie (FR)

( * ) Notice: Subject to any disclaimer, the term of this patent is extended or adjusted under 35 U.S.C. 154(b) by 482 days.

(21) Appl. No.: 17/286,482

(22) PCT Filed: Oct. 21, 2019

(86) PCT No.: PCT/EP2019/078579
§ 371 (c)(1),
(2) Date: Apr. 18, 2021

(87) PCT Pub. No.: WO2020/083838
PCT Pub. Date: Apr. 30, 2020

(65) Prior Publication Data
US 2021/0356574 A1 Nov. 18, 2021

(30) Foreign Application Priority Data
Oct. 22, 2018 (FR) ..................................... 18/01115

(51) Int. Cl.
*G01S 7/52* (2006.01)
*G01S 7/524* (2006.01)
(Continued)

(52) U.S. Cl.
CPC .......... *G01S 7/527* (2013.01); *G01S 7/52026* (2013.01); *G01S 7/524* (2013.01); *G01S 15/42* (2013.01); *G01S 15/62* (2013.01)

(58) Field of Classification Search
CPC ........ G01S 7/527; G01S 7/5206; G01S 7/524; G01S 15/42; G01S 15/62
See application file for complete search history.

(56) References Cited

U.S. PATENT DOCUMENTS

| | | | |
|---|---|---|---|
| 2006/0193206 A1* | 8/2006 | Alinat | G01S 7/527 367/88 |
| 2014/0266860 A1* | 9/2014 | Blumrosen | G01S 15/89 367/87 |
| 2016/0193629 A1* | 7/2016 | Hardie | B06B 1/0633 310/334 |

FOREIGN PATENT DOCUMENTS

| | | |
|---|---|---|
| FR | 2 499 252 A1 | 8/1982 |
| FR | 2499252 A1 * | 8/1982 ............. G01S 15/42 |

(Continued)

OTHER PUBLICATIONS

WO-2015092418-A2 (Machine Translation) (Year: 2015).*
FR-2499252-A1 (Machine Translation) (Year: 1982).*

*Primary Examiner* — Yuqing Xiao
*Assistant Examiner* — Christopher Richard Walker
(74) *Attorney, Agent, or Firm* — BakerHostetler

(57) ABSTRACT

A method for using an active sonar includes an acoustic antenna exhibiting a continuous bandwidth having a spectral emission width of at least two octaves and an electronic system for generating control signals for the acoustic antenna, the method comprising: dynamically selecting a plurality of distinct sonar functioning or operating modalities chosen from escort, surveillance, pursuit, dissuasion and communication, each using a different fraction of the emission bandwidth of the acoustic antenna, referred to as a channel; and using the electronic system to generate a plurality of control signals for the acoustic antenna corresponding to the selected functioning modalities, the electronic system being suitable for allowing the sonar to function according to a plurality of independent and simultaneous operating modalities. And sonar system for implementing such a method is also provided.

13 Claims, 5 Drawing Sheets

(51) Int. Cl.
*G01S 7/527* (2006.01)
*G01S 15/42* (2006.01)
*G01S 15/62* (2006.01)

(56) References Cited

FOREIGN PATENT DOCUMENTS

| | | |
|---|---|---|
| FR | 2 570 916 A1 | 3/1986 |
| GB | 2 516 976 A | 2/2015 |
| WO | WO-2015092418 A2 * | 6/2015 ............. G01N 29/34 |

* cited by examiner

METHOD FOR USING AN ACTIVE SONAR WITH A WIDE SPECTRAL EMISSION BAND AND SONAR SYSTEM

CROSS-REFERENCE TO RELATED APPLICATIONS

This application is a National Stage of International patent application PCT/EP2019/078579, filed on Oct. 21, 2019, which claims priority to foreign French patent application No. FR 18/01115, filed on Oct. 22, 2018, the disclosures of which are incorporated by reference in their entirety.

FIELD OF THE INVENTION

The invention relates to the field of sonar detection.

BACKGROUND

The range of an active sonar is currently increased by using low transmission frequencies to combat absorption and by improving the processing of the reception of echoes reflected by objects. Increasing the range entails two major drawbacks, however:

Sonar coverage is increasingly fragmented. This is because, owing to propagation phenomena, convergence phenomena and possible surface and bottom reflections of acoustic waves in water, long-range surveillance becomes optimum over a zone of limited extent. An increase in range is accompanied by an increasingly large increase in "blind" zones between the sonar and the region of convergence of the acoustic waves.

The period between two acoustic transmissions and therefore between two echo returns, referred to as recurrence, becomes proportionally longer as a function of the desired range. It is therefore possible for an object to cross the optimum detection zone between two pulses and therefore without being detected. Moreover, owing to the duration of sonar transmissions, this means that it is impossible to maintain continuous position detection (also referred to as pursuit) of an object close to the active sonar while retaining distant coverage. The timing of acoustic pulses therefore becomes problematic owing to the inability to cover all detection zones with a single type of transmission.

In spite of the increasingly frequent use of low-frequency sonars, in particular sonars towed by surface vessels or aboard submarines, there is no clear or generally acceptable solution to compensate for this deficiency. The most widely used solution involves shipping sensors more suited to short-distance surveillance or detection (buoys, hull-mounted sonar . . . ), which therefore require the use of other carriers or of additional sensors on the platform and thus a heavier load, greater size and higher cost.

As seawater is not a homogeneous medium, the propagation of sound waves is influenced by reliefs but also by the temperature of the water, pressure and even to a lesser degree the salinity of the water. Sound waves do not propagate in a straight line in water, but warp as a function of variations in temperature, pressure or salinity. They can be reflected by the bottom and by the surface or by a limit distinguishing warm water from cold water that is generally situated at a depth of between 30 and 100 meters, referred to as thermocline. Beyond the thermocline, the temperature becomes practically constant, and the waves naturally curve toward the surface under the influence of pressure. This is why some long-range sonars are consistently towed and submerged below the thermocline, thus benefiting from favorable propagation conditions. This is the case with VDS (Variable Depth Sonar) sonars.

Thus, at a certain distance from the sonar, which is dependent on the transmission frequency of the sound wave and the propagation conditions, the various propagation paths constructively interfere and form an annular region (convergence zone or ZC) around the sonar where the probability of target detection is at a maximum. This convergence zone defines a kind of barrier either side of which the probability of detecting a target is very low. The extent of these zones of low detection probability is ever greater as the surveillance range increases.

To carry out long-range surveillance and/or pursuit, it is necessary to use sonars that can transmit low-frequency acoustic pulses. This is because the loss of sound level, in decibels, of an acoustic wave is in the order of $20 \cdot \log(R) + \alpha(f) \cdot R$ where R is the propagation distance, $\alpha$ is the absorption coefficient of the sound wave, which increases as a function of the frequency of the sound wave (proportionally to the square of the frequency for simplicity). It is then understood that, in order to minimize the absorption coefficient and thus to be able to carry out long-range surveillance, it is necessary to transmit low-frequency (typically lower than 2 kHz) sound waves. Moreover, to work at long range, it is necessary to generate powerful acoustic pulses. Given energy and thermal constraints of the transmitter, the repetition rate of the pulses is low when the duration of the pulses is long. Moreover, a low repetition rate makes it possible to avoid distance ambiguity problems for the detection of echoes: if Pmax is the maximum desired search range for the scanning of the active sonar, then the unambiguous repetition rate must be no faster than 2Pmax/c, where c is the propagation speed of the acoustic wave in water (1500 m/s). Thus, for Pmax=100 km, the repetition rate must not exceed 133 sec. Typically, the duty cycle is lower than 10% and the pulse duration is several seconds.

FIG. 1 illustrates the functioning of a towed and submerged long-range active sonar 1 comprising an antenna that can transmit low-frequency pulses, which is known from the prior art. In the embodiment in FIG. 1, this sonar is of VDS type and is towed by a cable attached to a ship 2. The antenna of the sonar allows low-frequency (lower than 2 kHz) acoustic pulses to be transmitted at a power of higher than 220 dB, a rate of lower than 1 pulse/120 sec and a duration of greater than 12 sec. In FIG. 1, all of the paths of the acoustic pulses are schematically depicted by the envelope 4. These paths represent the propagation of sound waves in water. The convergence zone 6 (CZ) of the sound waves is the zone in which the probability of detecting an object is at a maximum. In the embodiment in FIG. 1, and according to the location of the carrier, the CZ is situated between 30 and 70 km. A single acoustic pulse 3 is spatially represented in the envelope 4. This pulse is also represented in the graph 100 of the frequency of the pulses transmitted as a function of time by the antenna of the sonar. This functioning mode allows object or target detection at a long distance. The acoustic antenna system is made up of a transmission source and a reception antenna. For simplicity, it is represented by a reception/transmission antenna. The latter allows acquisition of the sound waves reflected by the target 7, then determination of various parameters of the target from the echoes. The parameters to be determined are chosen from the position (distance and azimuth of the target), the speed, the direction of movement, the effective surface area of the detected target. The position is deduced from the delay between transmission and reception of a sound pulse reflected by the object. The effective surface area is deduced from the sound level of the echoes and from the detection distance. In FIG. 1, the detected target 7 is a submarine situated in the convergence zone 6.

However, as the repetition rate of the acoustic pulses transmitted by the antenna of the active sonar is low, the embodiment in FIG. 1 has a certain number of disadvantages:

An antenna cannot transmit and receive simultaneously on the same frequency, at the risk of creating distance ambiguities. There is therefore a "blind" zone close to the sonar where it is impossible to perform detection/surveillance. This blind zone corresponds to the propagation distance of an acoustic pulse transmitted by the sonar. Now, as stated above, the duration of acoustic pulses in long-range active sonars is long. This type of sonar therefore has a wider blind zone than shorter-range sonars. In FIG. 1, this blind zone is represented by the zone 5.

When a target is detected halfway along the range scale of the sonar, it becomes necessary to modify the rate of the sonar transmissions in order to optimize confirmation and pursuit of the detected object (with a long recurrence, suitable for distant surveillance, the detected object will only be "seen" too infrequently and will have time to disappear from the sonar screens before pursuit processing has been able to be engaged). In doing so, it is then impossible to maintain long-distance surveillance and a threat close to the convergence zone is therefore left the opportunity to cross it without being detected, the effective range of the sonar having been reduced by the change of rate.

As explained above, sonar coverage is increasingly patchy: propagation phenomena favor certain zones to the detriment of others.

FIG. 2 presents an embodiment of a sonar system 1 known from the prior art that is similar to the embodiment in FIG. 1 but that additionally comprises a hull-mounted sonar 8 aboard the ship 2. This hull-mounted sonar allows the performance of short-range detection that is in addition to the long-range sonar 1, and thus allows the existence of a "blind" zone close to the ship 2 to be avoided. The addition of a hull-mounted sonar therefore allows objects possibly present in the zone 25 to be detected simultaneously with long-range surveillance. The representation of frequency on the graph 200 of pulses transmitted as a function of time by the set formed by the long-range active sonar 1 and the hull-mounted sonar 8 illustrates the fact that the acoustic pulses 9 transmitted by the hull-mounted sonar can be very short (in the order of one second) at a higher rate (every 20 seconds, for example) with a center frequency higher than those of the long-range sonar. The fact that there are short pulses having a high center frequency allows higher resolution and detection performance.

FIG. 3 presents a top view of the embodiment of the sonar detection system in FIG. 2. The ship 2 comprises a long-range active sonar 1 and a hull-mounted sonar 8, which are not shown in FIG. 3. The top view permits observation of the sound pulses 9 transmitted by the hull-mounted sonar allowing surveillance in the zone 25 close to the ship and of the sound pulses 3 transmitted by the long-distance sonar allowing detection of the target 7. The embodiments in FIGS. 2 and 3 make it possible to solve the problem of the "blind" zone close to the sonar but still do not allow multiple types of detection/surveillance to be performed simultaneously (for example pursuit and long-range surveillance) and the problem of fragmented sonar coverage to be solved.

SUMMARY OF THE INVENTION

The invention aims to solve the aforementioned problems of the prior art. According to the invention, this aim is achieved by dividing the bandwidth into a plurality of dedicated channels, simultaneously and independently, having distinct operating modalities (long-range surveillance, short-range surveillance, pursuit, etc.). The channels are not rigidly predefined—as in the example in FIGS. 2 and 3, where the VDSs and the hull-mounted sonar each operate in a predetermined band; on the contrary, the emission band is divided dynamically, at the request of the user, which allows a sonar according to the invention to be adapted for multiple kinds of missions (escort, coastal surveillance . . . ). This involves a change of paradigm compared to the current approach, consisting in using the whole band of the antenna to improve the spatial resolution of the detection. The implementation of the invention necessitates an antenna exhibiting a band having a width of at least two octaves, and preferably at least three octaves, which is not the case with conventional antennas.

Thus, an object of the invention is a method for using an active sonar comprising an acoustic antenna exhibiting a continuous bandwidth having a spectral emission width of at least two octaves and an electronic system for generating control signals for said acoustic antenna, the method comprising:

dynamically selecting a plurality of distinct sonar functioning or operating modalities chosen from escort, surveillance, pursuit, dissuasion and communication, each using a different fraction of the emission bandwidth of the acoustic antenna, referred to as a channel; and using the electronic system to generate a plurality of control signals for said acoustic antenna corresponding to the selected functioning modalities, said electronic system being suitable for allowing the sonar to function according to a plurality of independent and simultaneous operating modalities.

According to particular embodiments of such a method:

each sonar functioning modality is defined by a set of acoustic transmission parameters comprising at least:
  a pulse duration;
  a pulse rate;
  a pulse center frequency;
  a pulse type; and
  a sound level.

it moreover comprises the following steps:
  the acoustic antenna acquiring echoes from the different channels reflected by one or more objects
  determining the parameters of the one or more objects from the different echoes.

the parameters to be determined are chosen from the speed, the position, the direction of movement and/or the effective surface area of the one or more objects.

the sonar functioning modalities are escort, surveillance, pursuit, dissuasion and communication.

the emission bandwidth of the acoustic antenna is divided into at least three channels covering a bandwidth of greater than two octaves so as to perform long-distance surveillance using the channel having the lowest center frequency, short-distance surveillance using the channel having the highest center frequency and pursuit using the channel having the intermediate center frequency.

the emission bandwidth of the acoustic antenna is divided into a fourth additional channel, having a center frequency between the center frequency of the channel suitable for short-range surveillance and that of the channel suitable for long-range surveillance, said channel having a repetition rate for the pulses of more than twice that of the short-range surveillance channel so as to function in dissuasion mode.

the emission bandwidth of the acoustic antenna is divided into a fifth additional channel, said channel being able to be used freely, including in continuous mode, with or without repetition, this channel being intended for acoustic communication.

the repetition rate of the acoustic pulses of the channel suitable for long-range surveillance is at least half that of the channel suitable for short-range surveillance.

the acoustic pulse duration of the channel suitable for long-range surveillance is at least twice that of the channel suitable for short-range surveillance.

the acoustic pulse center frequency of the channel suitable for long-range surveillance is at least half that of the channel suitable for short-range surveillance.

the spectral width of each channel is greater than 0.5 kHz and than 4 kHz for modulated frequencies.

Another object of the invention is an active sonar system for implementing a method for using an active sonar, comprising an acoustic antenna and an electronic system for generating control signals for said acoustic antenna, characterized in that the antenna exhibits a continuous bandwidth having a spectral emission width of at least two octaves and in that the electronic system for generating control signals for said acoustic antenna is configured to generate a plurality of control signals for said acoustic antenna corresponding to distinct sonar functioning modalities, chosen dynamically, each using a different fraction of the emission bandwidth of the acoustic antenna, referred to as a channel, said electronic system being suitable for allowing the sonar to function according to a plurality of independent and simultaneous operating modalities.

According to particular embodiments of such a system: said acoustic antenna is centered around a first longitudinal axis and comprises at least one first and one second set of at least two transducers stacked along said longitudinal axis, each transducer exhibiting at least one radial mode having a resonant frequency, called radial frequency, and one cavity mode having a resonant frequency, called cavity frequency, characterized in that the two transducers of the first set are configured to transmit sound waves in a first continuous frequency band extending at least between the cavity frequencies and the radial frequencies of the transducers of the first set and the two transducers of the second set are configured to transmit sound waves in a second continuous frequency band extending at least between the cavity frequencies and the radial frequencies of the transducers of the second set, in that the radial frequency of a transducer of the first set is substantially equal to the cavity frequency of a transducer of the second set and in that the transducers of the second set are placed between the transducers of the first set.

BRIEF DESCRIPTION OF THE DRAWINGS

Other features, details and advantages of the invention will become apparent upon reading the description provided with reference to the appended drawings, which are given by way of example and in which, respectively.

The references to the figures, where identical, correspond to elements that are the same.

Unless indicated otherwise, the elements in the figures are not to scale.

DETAILED DESCRIPTION

"Alerted surveillance" or "pursuit" is understood to mean continuous surveillance of the parameters of an object whose position has been located beforehand. "Nonalerted surveillance" or "surveillance" is understood to mean an active search in a certain zone for an object that has not been located beforehand. "Dissuasion" is understood to mean the transmission of an active pulse aiming to dissuade the object from pursuing its actions or its movements in a certain direction.

Operating mode and functioning mode are used interchangeably below.

Figure 4:
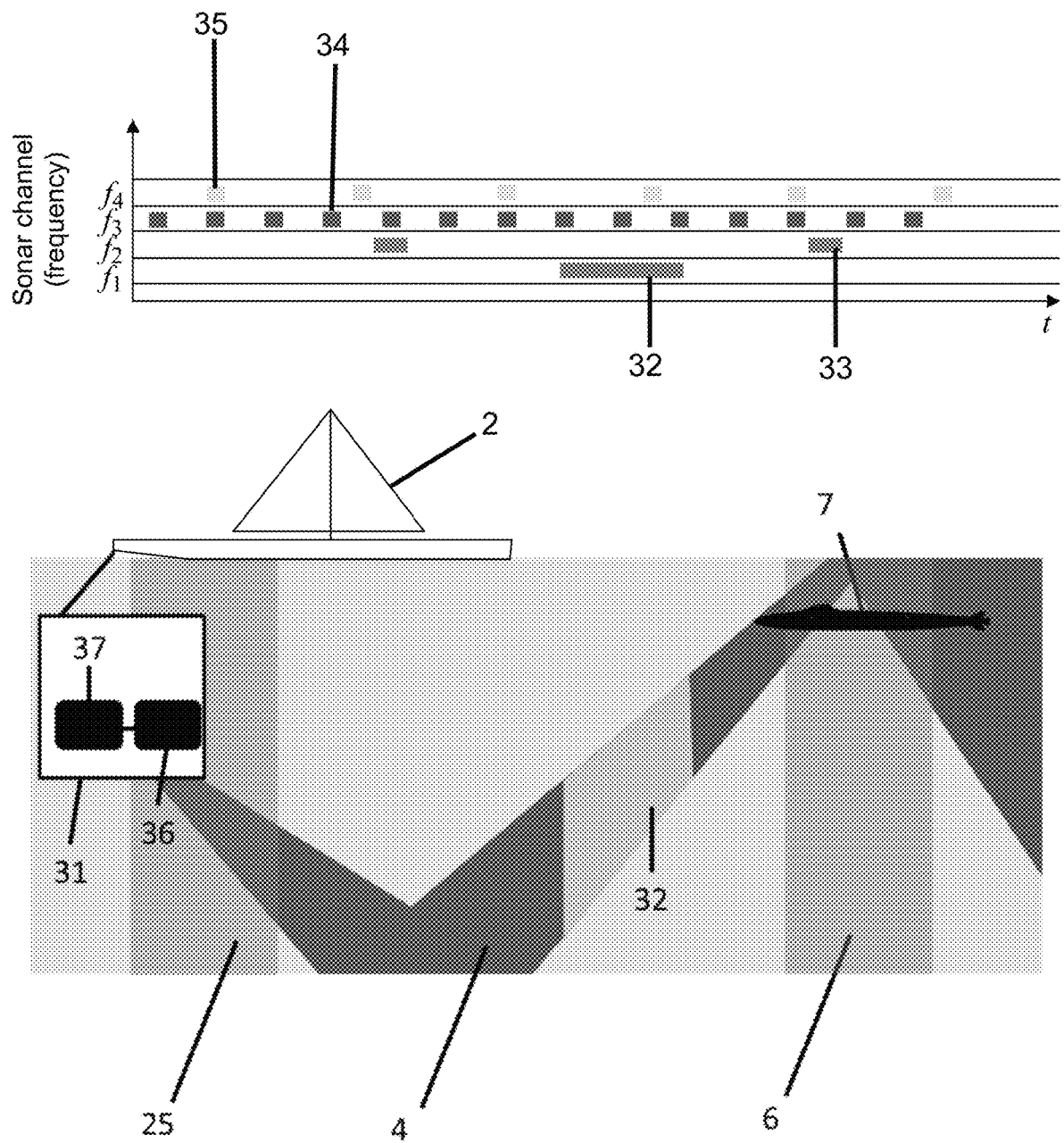
FIG. 4 depicts a sonar according to an embodiment of the invention.
Figure 5:
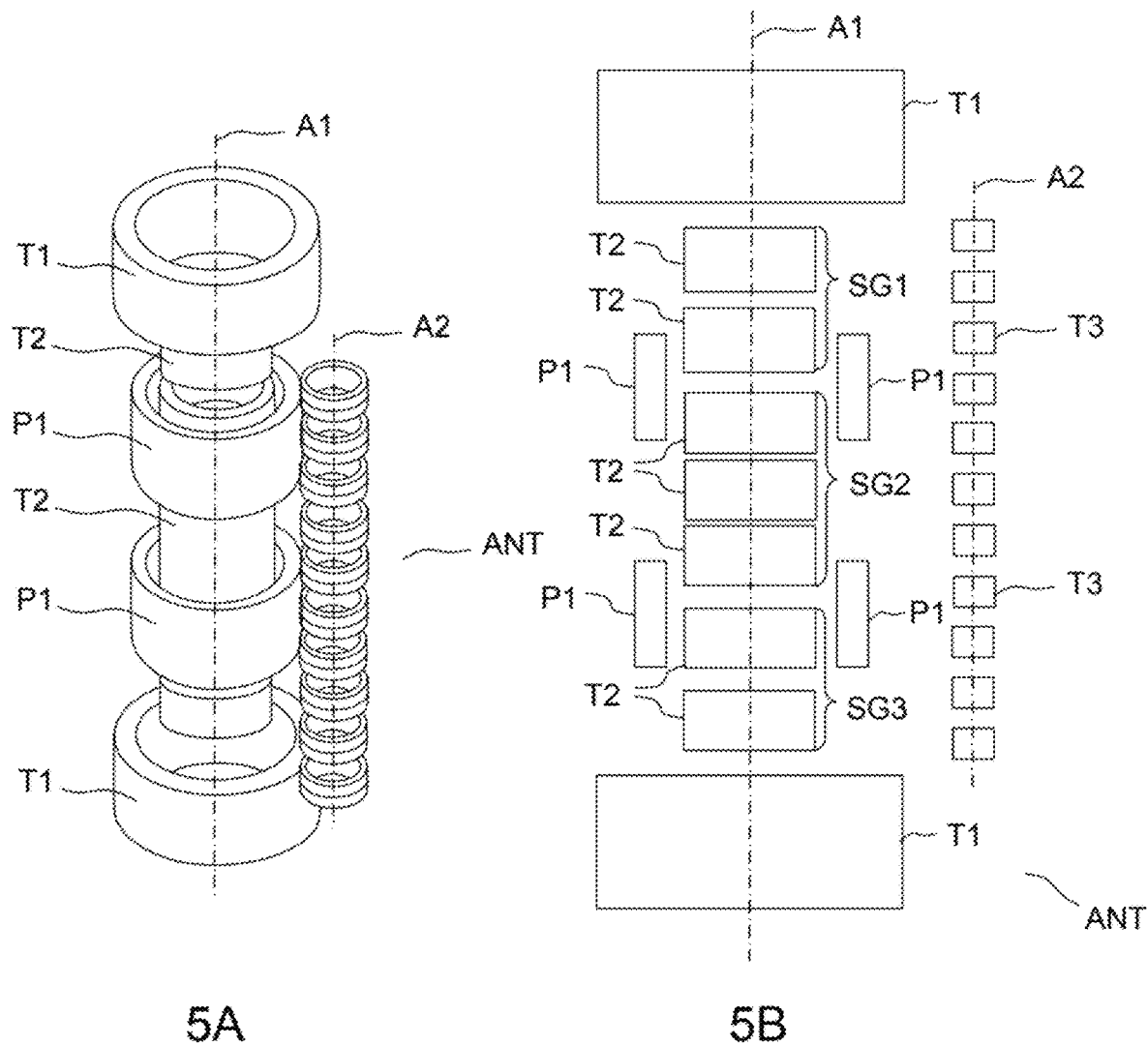
FIGS. 5A and 5B depict a wideband acoustic antenna allowing implementation of the invention.

FIG. 4 illustrates an embodiment of the invention in which an active sonar system 31 comprises an acoustic antenna 37 and an electronic system for generating control signals for said acoustic antenna 36. In the embodiment in FIG. 4, the antenna, which is submerged and towed by a ship 2, has a bandwidth having a spectral emission width of at least two octaves. The structure of the antenna is illustrated by FIGS. 5A and 5B and will be described in detail later on. In another embodiment, the transducer is made up of at least three sizes of different transducers of FFR type. This arrangement allows a large continuous bandwidth to be obtained while preserving a good transmission sound level (>>220 dB) throughout the band. Using such an antenna, it is then possible to divide the emission bandwidth of the antenna into multiple independent channels each corresponding to a distinct sonar functioning mode. The functioning modes corresponding to the different channels are defined by a set of acoustic pulse transmission parameters chosen from among the pulse center frequency, the pulse rate, the sound level, the pulse type (FM, CW, BPSK, PTFM[1], . . . ) and the pulse duration. The choice of the number of channels and the different acoustic transmission parameters of each channel corresponding to each sonar functioning mode is made dynamically in real time by the electronic system for generating control signals for said acoustic antenna. Thus, depending on the needs of the user, the active sonar system 31 can simultaneously perform multiple independent surveillance tasks (long-distance detection, short-distance detection, pursuit, dissuasion, communication . . . ) and these functioning modes can be modified and adapted in real time by the user by means of the electronic system for generating control signals for the acoustic antenna. This flexibility and this dynamism are made possible as a result of the continuous emission band of the antenna, which has a spectral emission width of greater than two octaves, being divided into channels. An emission band of an antenna is considered to be continuous here if it is not broken down into disjunct subbands with a gain drop of greater than −10 dB (preferably −5 dB, or even −3 dB) between subbands. More precisely, an emission band is considered to be continuous if the differences in sound level between the local maxima and the local minima of this band are strictly less than 10 dB (preferably 5 dB, or even 3 dB).

[1] FM=Frequency Modulation
CW=Continuous Wave

BPSK=Binary Phase Shift Keying
PTFM=Pulse Train Frequency Modulation

In the embodiment in FIG. 4, the bandwidth is divided into four channels (32, 33, 34, 35), as shown by the depiction of the frequency of the pulses transmitted as a function of time 300.

The first long-range channel 32 of center frequency $f_1 \in$ [1 kHz; 2 kHz], with a spectral width in the order of between several hundred Hz and 1 or 2 kHz, allows the generation of pulses having a duration that can reach more than 16 sec and having a sound level of broadly higher than 220 dB with a pulse rate suitable for ranges in the order of typically one or two CZs (80 km to 160 km). Due to the low center frequency of the pulses generated, this channel allows detection or long-range surveillance to be performed. In the embodiment in FIG. 4, the long-range detection using the first channel 32 is optimum in the convergence zone 6.

The bandwidth of the antenna is divided into a second pursuit channel 33 having a center frequency $f_2 > f_1$ that allows pursuit of a target to be performed. This channel has a center frequency $f_2 \in$ [2 kHz; 3 kHz] and a spectral width in the order of between several hundred Hz and 1 or 2 kHz, a similar sound level, a pulse duration of a few seconds and a pulse rate suitable (slightly higher) for the distance of the target to be tracked from the carrier. The rate of the pulses transmitted in this channel is higher so as to maintain contact with a target when it is detected in a zone inside the convergence zone 6. The center frequency $f_2$ is higher than $f_1$ in order to avoid interference problems between the two channels.

The third channel ("dissuasion") 34 having a center frequency $f_3 > f_2$ and a spectral width determined on the basis of the transmission code (Morse, noise troublesome for the crew of the threat . . . ) allows the sonar to function in dissuasion mode. The sound pulses of this channel are short (in the order of one second), at a very high rate (in the order of a few seconds) and of high sound level sufficient to be detected by the crew of the threat. The aim of this functioning mode is, for example, that of dissuading a target from continuing to move in a certain direction. As this mode is not intended for detection, the transmission rate can be rapid, without concern over distance ambiguities. On the contrary, a rapid rate can remind the target that the distance of the transmitter is close. The only constraint will be linked to the rest time necessary for the transmitter and for the transmission antenna between two transmissions.

Figure 1:
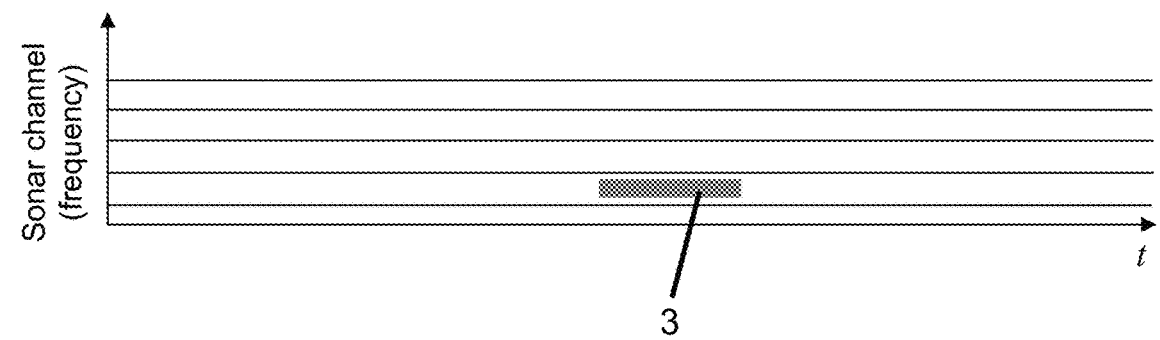
FIG. 1 depicts a carrier comprising a prior-art sonar of long-range surveillance type.
Figure 1:
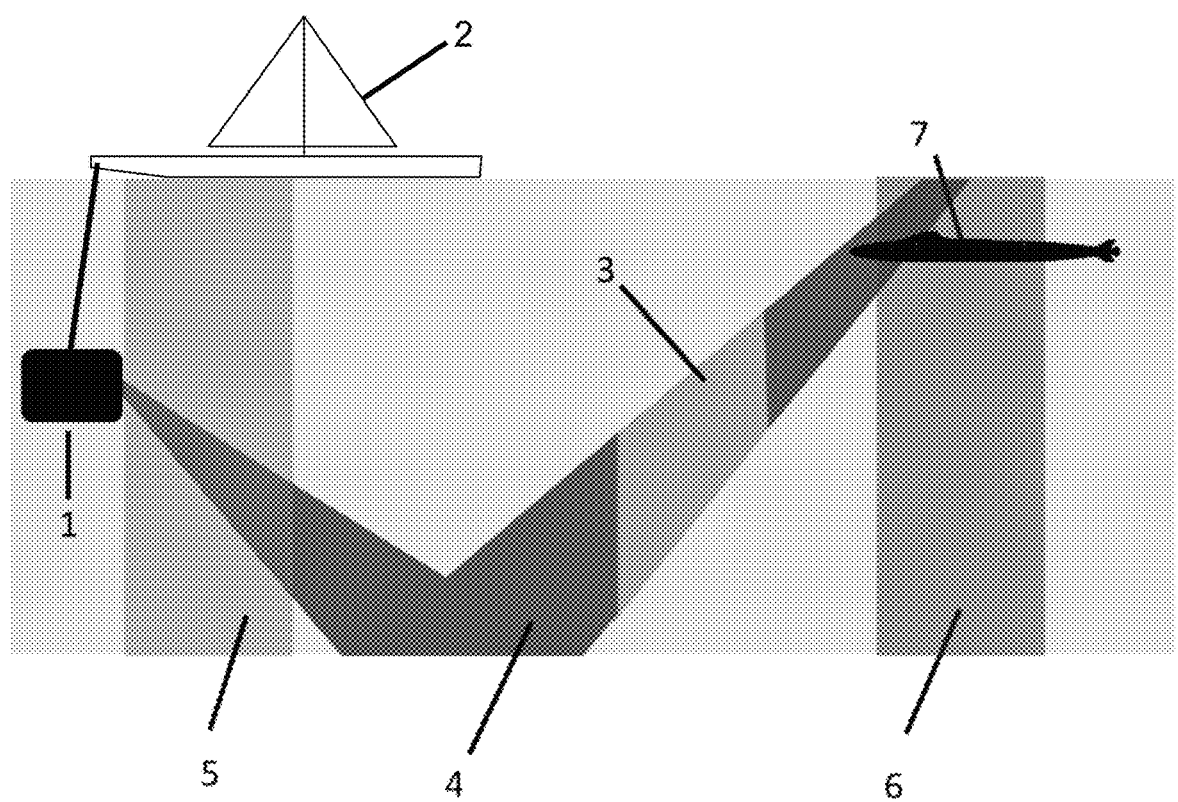
Figure 2:
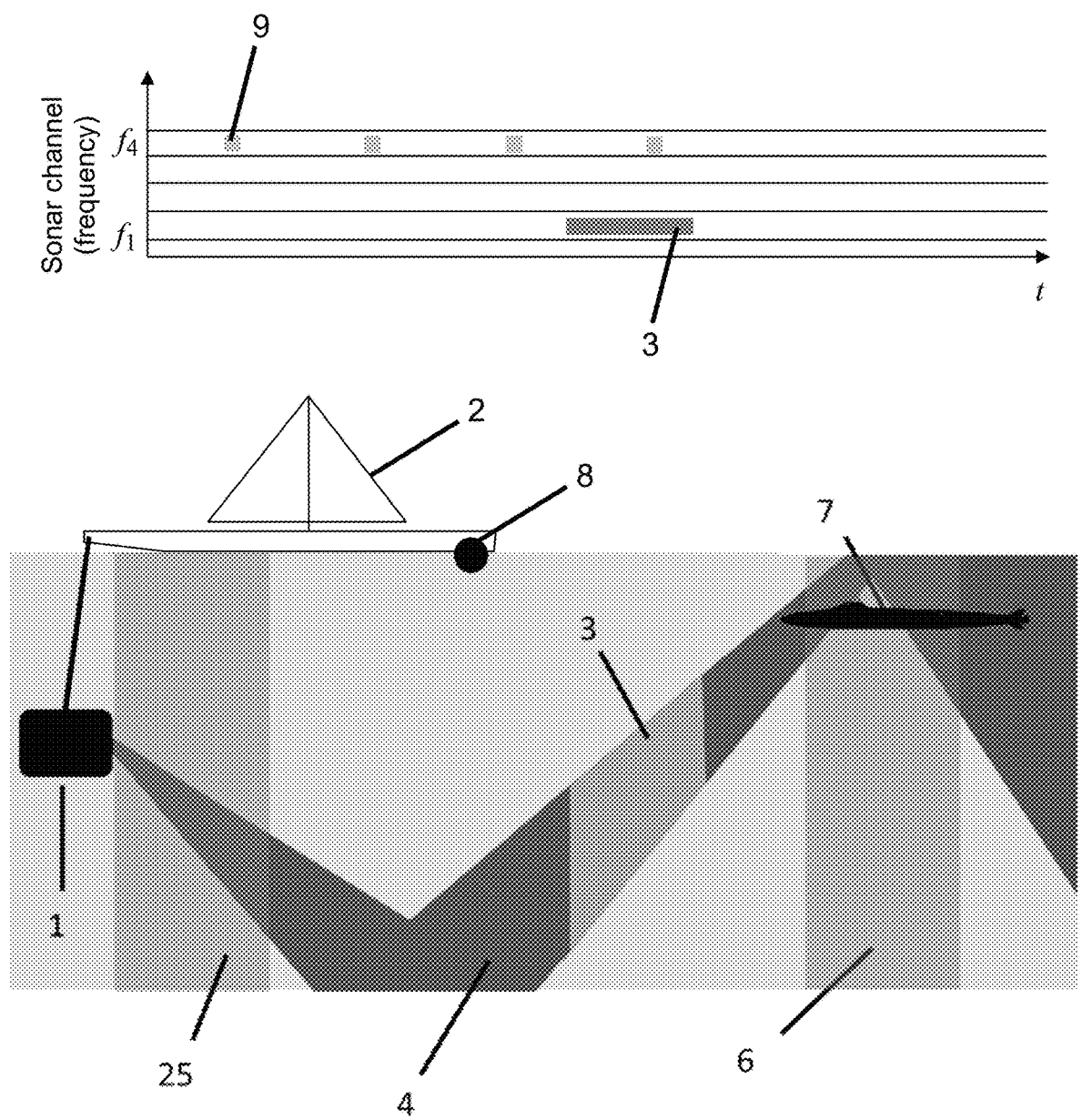
FIG. 2 depicts a carrier comprising a prior-art sonar of long-range surveillance type in combination with a hull-mounted sonar for short-distance surveillance.

Finally, the fourth short-range channel 35 has a center frequency $f_4 > f_3$ with $f_3 \in$ [5 kHz; 8 kHz] and a spectral width in the order of between several hundred Hz and 1 or 2 KHz or even 4 kHz. The pulses transmitted in this channel have a duration of one second maximum, a sound level of higher than 220 dB and a repetition rate in the order of 20 seconds, suitable for the size of the blind zone generated by the pulses at $f_1$. This channel allows short-range detection in the zone 25 close to the ship like that performed by the hull-mounted sonar in the embodiment in FIG. 2. Here, the pulses are shorter and the center frequency of the pulses is higher in order to have precise detection of the target. The transmission level can be lower, the search zone of interest (interrogated zone) being at shorter range.

In another embodiment, the repetition rate of the pulses of the dissuasion channel 34 is at least twice that of the short-range channel 35, which itself is at least twice that of the long-range channel 32. Moreover, the duration of the pulses of the long-range channel 32 is at least twice that of the pulses of the long-range channel 35 in order to have the highest-energy pulses possible while avoiding thermal problems for the transmission of the pulses.

In another embodiment, the transmission center frequency of the short-range channel is at least three times that of the long-range channel in order to improve the fineness of the detection.

In one embodiment, the transmission parameters of the channels 33 and 32 are identical (apart from the center frequency). In another embodiment, the transmission parameters are different.

In another embodiment, a fifth channel can be used for transmitting acoustic communications. This fifth channel will be able to make use of, for example, the top of the band of the transmission antenna, and a few kHz of band, in order to be able to transmit as much information as possible. In this case too, the transmission does not have to comply with a cycle between two transmissions, as the signal is not processed in return by the transmitter.

Figure 3:
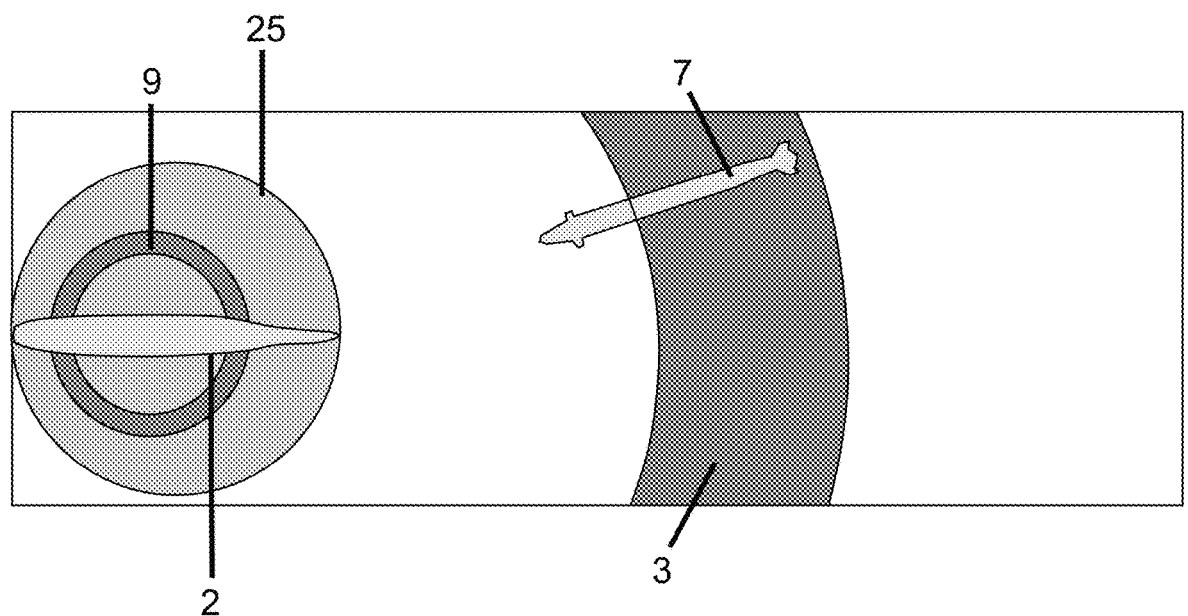
FIG. 3 depicts a top view of the carrier similar to that in FIG. 2.

Thus, the different functioning modes associated with the four (or five) channels are performed by a single active sonar 31. These functioning modes can be modified or adapted flexibly and dynamically by adjusting the division of the continuous bandwidth, having a large spectral width, of the acoustic antenna by virtue of the electronic system for generating control signals for said antenna. The method for using this active sonar of the embodiment in FIG. 3 comprises:
  dynamically selecting a plurality of distinct sonar functioning modalities, each using a different fraction of the emission bandwidth of the acoustic antenna, referred to as a channel (32, 33, 34, 35); and
  using the electronic system to simultaneously generate a plurality of control signals for said acoustic antenna corresponding to the selected functioning modalities, said electronic system being suitable for the sonar to function according to independent and simultaneous operating modes.

Dynamically selecting a plurality of operating modes is understood to mean that there is at least a first configuration corresponding to a first plurality of sonar operating modes and a second configuration corresponding to a second plurality of sonar operating modes, the second configuration corresponding to a division of the band into different channels from that of the 1st configuration. Preferably, there is not a predefined number of configurations: the division of the spectral band is defined freely by the user at the time of use of the sonar, without it being necessary to make hardware modifications to the sonar (for practical reasons, there can nevertheless be an upper limit for the number of channels).

The different sonar functioning modes and the transmission parameters of the different channels are given by way of example, and in other embodiments the subchannels have different acoustic transmission parameters associated with different sonar functioning modes. For example, there can be multiple channels having frequencies $f_{p1}$ and $f_{p2}$ that have the aims of performing simultaneous pursuit of two distinct targets.

In another example, the center frequencies associated with the different functioning modes are suitable, according to the depth of use, for taking into consideration the level of reverberation.

In another embodiment, the number of channels is different than 4 and greater than 1, the center frequency of the channels is different in order to avoid interference problems between channels and the spectral width of each channel is greater than 1 or 2 KHz. The antenna system of the embodiment in FIG. 4 is a transmission/reception system. It therefore allows acquisition of the echoes from the sound waves reflected by one or more objects and then determination of various parameters of the one or more objects from the echoes. The parameters to be determined are chosen from the position, the speed, the direction of movement, the effective surface area of the one or more detected objects.

In another embodiment, in which multiple ships or fixed vessels are equipped with sonar systems similar to that in FIG. 4, it is possible for each of the sonars to use a channel having a different center frequency and a spectral emission width of greater than 1 kHz so as to be able to function without loss of performance and without interference between the different sonars of the different platforms.

FIG. 5A shows a perspective view of an embodiment of a wideband acoustic antenna that can be used for implementing the invention, and FIG. 5B shows a schematic view of this same antenna. However, it is important to emphasize that the invention is not limited to one particular type of antenna and to this embodiment. Other embodiments are conceivable.

The antenna ANT is centered around a first longitudinal axis A1 and comprises a first set of at least two annular transducers T1 (exactly two in the embodiment illustrated) and a second set of at least two transducers T2 (seven in the embodiment illustrated). The annular transducers T1 and T2 are formed around the same longitudinal axis A1. The transducers T2 are placed between the transducers T1 without there being any physical overlap between the transducers T1 and T2. This makes it possible to avoid adverse acoustic interactions, such as the masking of the transducers T2 by the transducers T1. Each transducer (T1, T2) exhibits at least one radial mode having a resonant frequency, called radial frequency, and at least one cavity mode having a resonant frequency, called cavity frequency. The transducers T1 of the first set are configured to transmit sound waves in a first frequency band extending at least between the cavity frequencies and the radial frequencies of the transducers T1, and the transducers T2 of the second set are configured to transmit sound waves in a second frequency band extending at least between the cavity frequencies and the radial frequencies of the transducers T2.

The transducers T1 and T2 have different physical sizes, in particular the transducers T2 have smaller physical dimensions than those of the transducers T1, so that the cavity frequency of a transducer T2 of the second set is substantially equal to the radial frequency of a transducer T1 of the first set. The expression "substantially equal" means that the cavity frequency of a transducer T2 is equal to the radial frequency of the transducers T1 plus or minus (fr1−fc1)/10, that is to say that fc2=fr1±(fr1−fc1)/10, fr1 being the radial frequency of the transducer of the first set and fc1 being the cavity frequency of the transducer of the first set. This makes it possible to obtain a continuous transmission frequency band comprising the frequencies of the first and second frequency bands.

Although not strictly essential, the transducers T2 of the second set are divided into subgroups comprising at least two transducers. In this first embodiment, the transducers T2 are divided into three subgroups (SG1, SG2, SG3). The first subgroup SG1 comprises two transducers T2, the second subgroup SG2 comprises three transducers T2 and the third subgroup SG3 comprises two transducers T2. Subgroup SG2 is placed between subgroups SG1 and SG3. The spacing between each subgroup, that is to say between subgroups SG1 and subgroups SG2 and SG3 for this first embodiment, is greater than the spacing between the transducers T2 of one and the same subgroup. This allows multiple functions to be performed with the transducers T2.

Each subgroup (SG1, SG2, SG3) exhibits at least one cavity mode having a resonant frequency, called group cavity frequency. Indeed, when two identical annular transducers are arranged one above the other at a short distance compared to the acoustic wavelength of their cavity modes, these modes interact and their frequency decreases (the frequency of the radial mode is not affected). Thus, as the transducers T2 have equivalent physical dimensions, it is the spacings between the transducers T2 of one and the same subgroup that allow the group cavity frequency of a subgroup to be modified.

At least one of the subgroups has a group cavity frequency substantially equal to the radial frequency of the transducers T1 of the first set. At least one other of the subgroups has a group cavity frequency substantially equal to the cavity frequency of the transducers T1 of the first set. In the embodiment in FIGS. 5A and 5B, it is the transducers T2 of the first subgroup SG1 and of the third subgroup SG3 that have a group cavity frequency substantially equal to the radial frequency of the transducers T1 of the first set; and it is the transducers T2 of the second subgroup SG2 that have a group cavity frequency substantially equal to the cavity frequency of the transducers T1 of the first set. In this embodiment, the spacing between the transducers T2 within the second subgroup SG2 is therefore smaller than the spacing between the transducers T2 within subgroups SG1 and SG3. The radial frequency of the transducers T2 is not affected by the spacing of the transducers T2 within a subgroup.

Subgroup SG2 allows the sound level of the transducers T1 to be increased, that is to say the transmission in the first frequency band to be reinforced, while the transducers T2 of subgroups SG1 and SG3, by having the same cavity frequency substantially equal to the radial frequency of the transducers T1, allow the transmission in the second frequency band to be reinforced.

In order to reinforce the sound level in the cavity frequency band of the transducers T1, that is to say at the level of the lower limit of the first frequency band, passive elements P1 are added to the antenna ANT. These passive elements P1 are stacked along the longitudinal axis A1, surround the transducers T2 of the second set and are placed between the transducers T1 of the first set. They exhibit at least one radial mode having a resonant frequency, called radial frequency, and at least one cavity mode having a resonant frequency, called cavity frequency.

So as not to disrupt the radial mode of the transducers T2, the passive elements P1 are made from a material such that the E/ρ ratio of this material is higher than that of the material making up the transducers T2 of the second set, E being the Young's modulus of the materials and ρ being their density. This also allows the obtainment of a passive element P1 of diameter greater than that of the transducers T2 while having a radial mode that is resonant at the same frequency, that is to say that the radial frequency of the passive elements P1 is substantially equal to the radial frequency of the transducers T2.

Moreover, to prevent the transmission of the passive elements P1 from masking the transmission of the transducers T2, the radial frequency of the passive elements P1 is substantially equal to a radial frequency of the transducers T2 of the second set and the cavity frequency of the passive elements P1 is included in the first frequency band.

The excitation of the passive elements P1 stems from the acoustic field generated by the transducers T1 and the central transducers T2, that is to say the transducers T2 of subgroup SG2 in this embodiment.

The different transducers can be excited by the same electrical excitation signal, coming from a signal generator, which is not shown. Phase shifters can be placed between the generator and certain elements in order to eliminate destructive interference capable of attenuating certain spectral components. For example, a first phase shifter can phase-shift the excitation signals of the transducers T2 of subgroups SG1 and SG3 with respect to the transducers T1, and a second phase shifter can phase-shift the excitation signals of the transducers T2 of subgroup SG2 with respect to the transducers T1. As a variant, a single phase shifter can phase-shift the excitation signals of all the transducers T2 with respect to the transducers T1, ignoring the subdivision of the transducers T2 into subgroups.

The use of the transducers T1 and T2, and possibly of the passive rings P1, allows approximately two octaves to be covered. In order to obtain a continuous spectral band extending over three octaves or more, transducers T3 designed to transmit sound waves in a third continuous frequency band, which is different than the first and second frequency bands, are used. More particularly, the transducers T3 exhibit at least one radial mode having a resonant frequency, called radial frequency, and at least one cavity mode having a resonant frequency, called cavity frequency. The third frequency band extends at least between the cavity frequencies and the radial frequencies of the transducers T3 of the third set. Moreover, the cavity frequency of the transducers T3 of the third set is substantially equal to the radial frequency of the transducers T2 of the second set. The confluence of the first, second and third frequency bands therefore allows a continuous frequency band covering three octaves to be obtained.

The transducers T3 are stacked along a second longitudinal axis A2 parallel to the axis A1. Their small dimensions mean that they mask the transducers T1 and T2 very little; on the other hand, they are masked by said transducers. In order to obtain truly omnidirectional transmission over the whole spectral band, it is necessary to provide for multiple stacks of transducers T3 arranged around the stack of transducers T1 and T2.

In practice, the reception antenna will be able to be made up of a linear antenna (in the case of towing) or surface antenna (in the case of a hull-mounted antenna) having a large extent in order to have good sensitivity and low-frequency resolution.

To cover all frequencies addressed by the transmission antenna, the pitches and density of sensors will be able to vary according to the location vis-à-vis the complete antenna (for example interleaved antenna sections).

This antenna will be equipped with hydrophones, single-point or surface, covering the whole transmitted band. Another implementation will be able to be provided on the basis of sensors that can determine the direction of arrival of the sound wave (vector sensors, geophones, accelerometer combination . . . ).

The invention claimed is:

1. A method for using an active sonar comprising an acoustic antenna exhibiting a continuous bandwidth having a spectral emission width of at least two octaves and an electronic system for generating control signals for said acoustic antenna, the method comprising:
   dynamically selecting a plurality of distinct sonar functioning or operating modalities chosen from escort, surveillance, pursuit, dissuasion and communication, each using a different fraction of said continuous bandwidth of the acoustic antenna, referred to as a channel; and
   using the electronic system to generate a plurality of control signals for said acoustic antenna corresponding to said selected plurality of distinct sonar functioning or operating modalities, said electronic system being suitable for allowing the active sonar to function according to a plurality of independent and simultaneous operating modalities.

2. The method as claimed in claim 1, wherein each sonar functioning modality is defined by a set of acoustic transmission parameters comprising at least:
   a pulse duration;
   a pulse rate;
   a pulse center frequency;
   a pulse type; and
   a sound level.

3. The method as claimed in claim 1, moreover comprising the following steps:
   the acoustic antenna acquiring echoes from the different channels reflected by one or more objects
   determining parameters of the one or more objects from the different echoes.

4. The method as claimed in claim 3, wherein the parameters to be determined are chosen from a speed, a position, a direction of movement and/or an effective surface area of the one or more objects.

5. The method as claimed in claim 1, wherein said continuous bandwidth of the acoustic antenna is divided into at least three channels covering a bandwidth of greater than two octaves so as to perform long-distance surveillance using the channel having the lowest center frequency, short-distance surveillance using the channel having the highest center frequency and pursuit using the channel having the intermediate center frequency.

6. The method as claimed in claim 5, wherein said continuous bandwidth of the acoustic antenna is divided into a fourth additional channel, having a center frequency between the center frequency of the channel suitable for short-range surveillance and that of the channel suitable for long-range surveillance, said channel having a repetition rate for the pulses of more than twice that of the short-range surveillance channel so as to function in dissuasion mode.

7. The method as claimed in claim 6, wherein said continuous bandwidth of the acoustic antenna is divided into a fifth additional channel, said channel being able to be used freely, including in continuous mode, with or without repetition, this channel being intended for acoustic communication.

8. The method as claimed in claim 5, wherein a repetition rate of the acoustic pulses of the channel suitable for long-range surveillance is at least half that of the channel suitable for short-range surveillance.

9. The method as claimed in claim 5, wherein an acoustic pulse duration of the channel suitable for long-range surveillance is at least twice that of the channel suitable for short-range surveillance.

10. The method as claimed in claim 5, wherein the center frequency of the channel suitable for long-range surveillance is at least half that of the channel suitable for short-range surveillance.

11. The method as claimed in claim 5, wherein a spectral width of each channel is greater than 0.5 kHz and than 4 kHz for modulated frequencies.

12. An active sonar system for implementing a method for using an active sonar, comprising an acoustic antenna and an electronic system for generating control signals for said acoustic antenna, wherein the acoustic antenna exhibits a continuous bandwidth having a spectral emission width of at least two octaves and in that the electronic system for generating control signals for said acoustic antenna is configured to generate a plurality of control signals for said acoustic antenna corresponding to distinct sonar functioning modalities chosen from escort, surveillance, pursuit, dissuasion and communication, chosen dynamically, each using a different fraction of the emission bandwidth of the acoustic antenna, referred to as a channel, said electronic system being suitable for allowing the active sonar to function according to a plurality of independent and simultaneous operating modalities.

13. The system as claimed in claim 12, wherein said acoustic antenna is centered around a first longitudinal axis and comprises at least one first and one second set of at least two transducers stacked along said longitudinal axis, each transducer exhibiting at least one radial mode having a resonant frequency, called radial frequency, and one cavity mode having a resonant frequency, called cavity frequency, wherein the two transducers of the first set are configured to transmit sound waves in a first continuous frequency band extending at least between the cavity frequencies and the radial frequencies of the transducers of the first set and the two transducers of the second set are configured to transmit sound waves in a second continuous frequency band extending at least between the cavity frequencies and the radial frequencies of the transducers of the second set, in that the radial frequency of a transducer of the first set is substantially equal to the cavity frequency of a transducer of the second set and in that the transducers of the second set are placed between the transducers of the first set.

* * * * *